(12) United States Patent
Lam et al.

(10) Patent No.: US 10,672,143 B2
(45) Date of Patent: Jun. 2, 2020

(54) IMAGE PROCESSING METHOD FOR GENERATING TRAINING DATA

(71) Applicant: SEIKO EPSON CORPORATION, Tokyo (JP)

(72) Inventors: Joseph Chitai Lam, Toronto (CA); Syed Alimul Huda, Scarborough (CA); Jennifer Jianing Sun, North York (CA)

(73) Assignee: SEIKO EPSON CORPORATION, Tokyo (JP)

( * ) Notice: Subject to any disclaimer, the term of this patent is extended or adjusted under 35 U.S.C. 154(b) by 132 days.

(21) Appl. No.: 15/451,752

(22) Filed: Mar. 7, 2017

(65) Prior Publication Data
US 2017/0287165 A1 Oct. 5, 2017

(30) Foreign Application Priority Data
Apr. 4, 2016 (JP) ................... 2016-075092

(51) Int. Cl.
*G06T 7/73* (2017.01)
*G06T 7/564* (2017.01)
*G06T 17/00* (2006.01)
*G06T 11/00* (2006.01)

(52) U.S. Cl.
CPC ............... *G06T 7/75* (2017.01); *G06T 7/564* (2017.01); *G06T 11/00* (2013.01); *G06T 17/00* (2013.01); *G06T 2207/10016* (2013.01); *G06T 2207/30244* (2013.01)

(58) Field of Classification Search
None
See application file for complete search history.

(56) References Cited

U.S. PATENT DOCUMENTS

| 6,116,640 A | 9/2000 | Tanaka et al. |
| 7,889,193 B2 | 2/2011 | Platonov et al. |
| 8,578,299 B2 | 11/2013 | Chen et al. |
| 8,780,110 B2 | 7/2014 | Ben Himane et al. |

(Continued)

FOREIGN PATENT DOCUMENTS

| JP | 2011129082 A | * | 6/2011 |
| JP | 2013-050947 A |   | 3/2013 |

OTHER PUBLICATIONS

Jaramillo, Carlos, et al. "6-DoF pose localization in 3D point-cloud dense maps using a monocular camera." 2013 IEEE International Conference on Robotics and Biomimetics (ROBIO). IEEE, 2013 (Year: 2013).*

U.S. Appl. No. 16/123,372, filed Sep. 6, 2018 in the name of Brusnitsyn.

U.S. Appl. No. 15/951,840, filed Apr. 12, 2018 in the name of Ahmed et al.

U.S. Appl. No. 15/949,728, filed Apr. 10, 2018 in the name of Mukherjee et al.

(Continued)

*Primary Examiner* — Sarah Le
(74) *Attorney, Agent, or Firm* — Oliff PLC

(57) ABSTRACT

A method includes steps of: (a) causing a display device to display an image of a real object based on captured image data of a real object; (b) causing the display device to display a 2D model obtained from a projection of a 3D model corresponding to the real object based at least on a view; and (c) storing appearance data of the real object and data of the 2D model into a memory device while associating the appearance data and the data of the 2D model with each other after the real object and the 2D model are displayed so as to be aligned with or substantially aligned with each other by the display device.

9 Claims, 11 Drawing Sheets

(56) References Cited

U.S. PATENT DOCUMENTS

| | | | |
|---|---|---|---|
| 9,002,098 | B1 | 4/2015 | Chelian et al. |
| 9,111,347 | B2 | 8/2015 | Ben Himane |
| 9,330,491 | B2 | 5/2016 | Wang et al. |
| 9,875,427 | B2 | 1/2018 | Medasani et al. |
| 10,373,380 | B2 | 8/2019 | Kutliroff et al. |
| 2009/0096790 | A1 | 4/2009 | Wiedemann et al. |
| 2011/0002531 | A1 | 1/2011 | Heisele et al. |
| 2012/0120199 | A1* | 5/2012 | Ben Himane ............ G06T 7/75 348/46 |
| 2012/0314096 | A1 | 12/2012 | Kruglick |
| 2013/0051626 | A1 | 2/2013 | Abadpour et al. |
| 2013/0218530 | A1* | 8/2013 | Deichmann ........ A61C 13/0004 703/1 |
| 2014/0079314 | A1 | 3/2014 | Yakubovich et al. |
| 2014/0098100 | A1 | 4/2014 | Dane et al. |
| 2015/0154786 | A1 | 6/2015 | Furukawa et al. |
| 2015/0161457 | A1 | 6/2015 | Hayakawa et al. |
| 2017/0053447 | A1 | 2/2017 | Chen et al. |
| 2017/0214899 | A1 | 7/2017 | Meier et al. |
| 2018/0182071 | A1 | 6/2018 | Ayari et al. |
| 2018/0253593 | A1 | 9/2018 | Hu et al. |

OTHER PUBLICATIONS

Konishi et al; "Fast 6D Object Pose Estimation from a Monolcular Image using Hierarchical Pose Trees;" OMRON Corportaion; 2016; 1 page.

Peng; "Combine color and shape in real-time detection of textureless objects;" Computer Vision and Image Understanding; vol. 135; 2015; pp. 31-48.

U.S. Appl. No. 15/839,247, filed Dec. 12, 2017 in the name of Moravec et al.

U.S. Appl. No. 15/875,579, filed Jan. 19, 2018 in the name of Szeto et al.

Apr. 19, 2019 Office Action issued in U.S. Appl. No. 15/875,579.

Oct. 3, 2019 Office Action issued in U.S. Appl. No. 15/951,840.

Jan. 13, 2020, Office Action issued U.S. Appl. No. 15/949,728.

Dec. 18, 2019 Notice of Allowance issued in U.S. Appl. No. 16/123,372.

Mar. 11, 2020 Office Action Issued in U.S. Appl. No. 15/951,840.

* cited by examiner

IMAGE PROCESSING METHOD FOR GENERATING TRAINING DATA

BACKGROUND

1. Technical Field

The present invention relates to a computer program causing a computer capable of communicating with an image processing system to realize image processing.

2. Related Art

As a method of estimating a pose of an object imaged by a camera, JP-A-2013-50947 discloses a technique in which a binary mask of an input image including an object is created, singlets as points in inner and outer contours of the object are extracted from the binary mask, and sets of singlets are connected to each other so as to form a mesh represented as a duplex matrix so that a pose of the object is estimated.

SUMMARY

Object recognition (object detection) includes detecting an object of interest in a scene and specifying a pose (translation and orientation) of the object in a predetermined three-dimensional coordinate system. In order to solve an object recognition problem by using color or luminance information obtained from an RGB or luminance images, and to improve detection accuracy and pose specifying accuracy, generally, a computer vision system preferably stores appearances (appearance data) of an object viewed from various viewpoints during an offline training phase.

However, generating training data (template) including an appearance of an object is cumbersome work for normal users since prior knowledge about fields of computer vision and object recognition is necessary.

In order to generate training data (template), in a case where a 3D CAD model accompanied by texture information (that is, a texture map) is available, it is possible to perform rendering (drawing onto a 2D surface) of an object from different viewpoints (views) in a photo-realistic manner (accompanied by a realistic feeling as in a picture). The accuracy of a generated image depends on a resolution of provided appearance data (texture information) and elements regarding simulated illumination. However, it cannot be said that such a 3D CAD model is widespread. In other words, it cannot be said that a user can normally acquire a 3D CAD model accompanied by such appearance data with respect to a real object which is desired to be detected.

An advantage of some aspects of the invention is to solve at least a part of the problems described above, and the invention can be implemented as the following aspects.

(1) A method includes steps of: (a) causing a display device to display an image of a real object based on captured image data of a real object; (b) causing the display device to display a 2D model obtained from a projection of a 3D model corresponding to the real object based at least on a view; and (c) storing appearance data of the real object and data of the 2D model into a memory device while associating the appearance data and the data of the 2D model with each other after the real object and the 2D model are displayed so as to be aligned with or substantially aligned with each other by the display device.

(2) According to another aspect of the invention, the method may further include a step of: (d) presenting a user interface for adjusting the view so that the real object and the 2D model are displayed so as to be substantially aligned with each other by the display device.

(3) According to still another aspect of the invention, the captured image data may represent a still image of the real object.

(4) According to still another aspect of the invention, the method may further include a step of: (e) refining the view after the real object and the 2D model are displayed so as to be aligned with or substantially aligned with each other by the display device. The step (c) may include storing the appearance data of the real object and refined data of the 2D model obtained from a projection of the 3D model based at least on the refined view, while associating the appearance data and the refined data with each other.

(5) According to still another aspect of the invention, the method may further include steps of: (f) tracking a pose of the real object based at least on the captured image data after the real object and the 2D model are displayed so as to be substantially aligned with each other by the display device; and (g) obtaining the 2D model from a projection of the 3D model based at least on the view that corresponds to the tracked pose. The step (c) may include storing the appearance data of the real object and the data of the 2D model while associating the appearance data and the data of the 2D model with each other, with respect to a plurality of the tracked poses obtained by the step (f).

(6) According to still another aspect of the invention, the method may further include a step of: (h) imaging the real object with an imaging section so as to obtain the captured imaged data.

(7) According to still another aspect of the invention, the imaging section may provide, as the captured image data, a video sequence which is obtained while the imaging section is being moved relative to the real object, and the method may further include steps of: (i) deriving a pose of the real object by refining the view in the case where one image frame representing the real object having a pose corresponding to the view of the 3D model is selected; and (j) tracking the pose of the real object in at least one of preceding and succeeding image frames with respect to the selected one image frame. The step (c) may include storing the appearance data of the real object and the data of the 2D model while associating the appearance data and the data of the 2D model with each other, with respect to a plurality of the tracked poses obtained by the step (j).

(8) According to still another aspect of the invention, a non-transient computer readable media stores a computer program embodying instructions to execute the method by a computing device.

The invention may be implemented in various forms other than the method. For example, the invention may be implemented in forms such as an information processing device, an image display device, a control method for the information processing device and the image display device, an information processing system, a recording medium such as a non-transient computer readable media storing the computer program thereon, and data signals which include the computer program and are embodied in carrier waves.

BRIEF DESCRIPTION OF THE DRAWINGS

The invention will be described with reference to the accompanying drawings, wherein like numbers reference like elements.

DESCRIPTION OF EXEMPLARY EMBODIMENTS

In the present specification, description will be made in order according to the following items.

A. First Embodiment
A-1. Configuration of image processing system
A-2. Data creation without using marker
A-2-1. Online data creation
A-2-2. Offline data creation
B. Second Embodiment
B-1. Configuration of image processing system
B-2. Data creation based on marker
C. Modification Examples

A. First Embodiment

A-1. Configuration of Image Processing System

Figure 1:
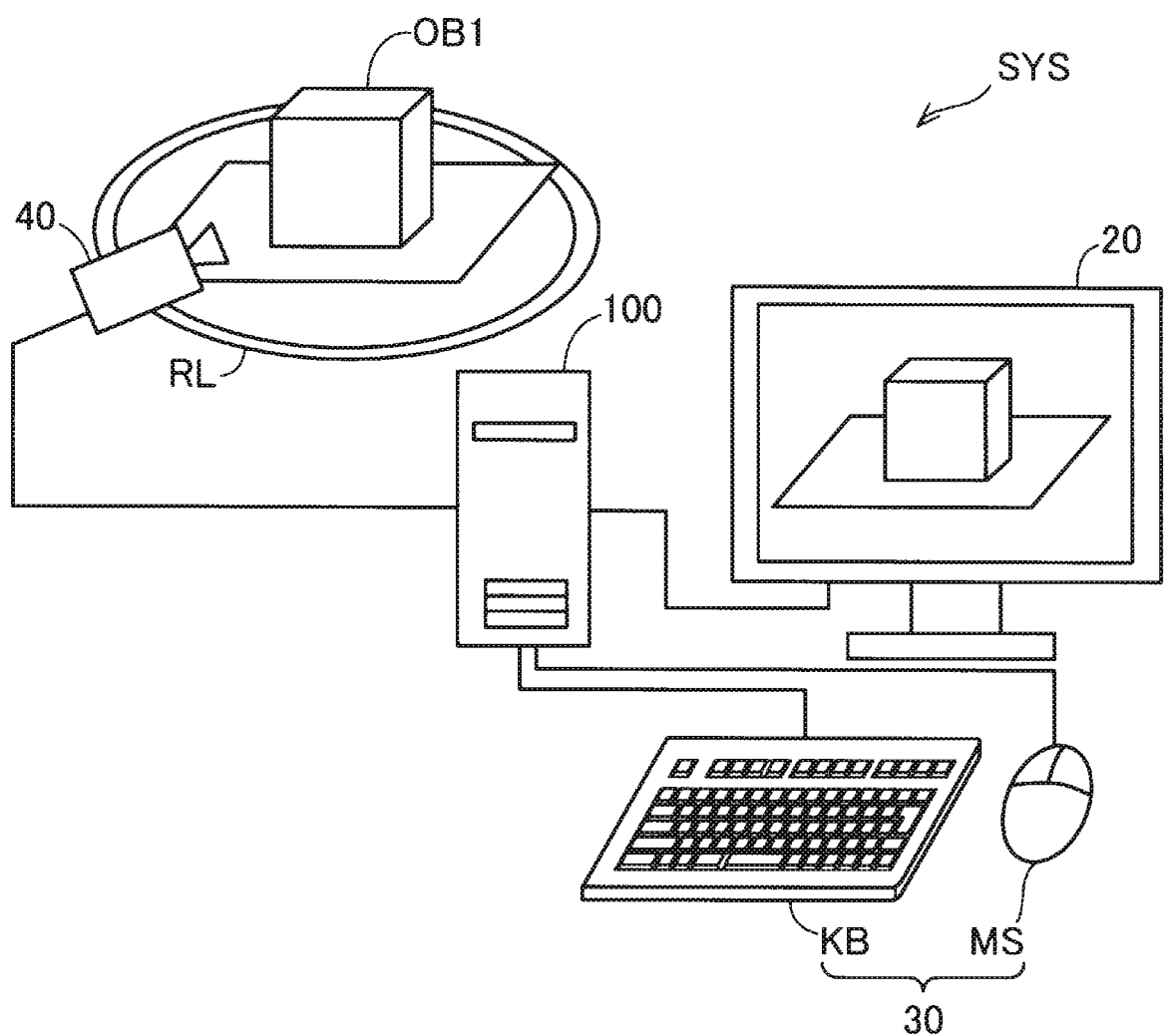
FIG. 1 is a schematic configuration diagram of an image processing system in the present embodiment.

FIG. 1 is a schematic configuration of an image processing system SYS in the present embodiment. The image processing system SYS images a target real object OB1, and creates new association data in which captured image data of the imaged real object OB1 is associated with data of a 3D model of the real object OB1, stored in advance.

The image processing system SYS includes a main body section 100, an imaging section 40, a display section 20, and an operation section 30. The main body section 100 is electrically connected to the display section 20, the operation section 30, and the imaging section 40. The main body section 100 transmits control signals to the display section 20, the operation section 30, and the imaging section 40 so as to control the sections. Details of control performed by the main body section 100 will be described later.

The imaging section 40 images external scenery on the basis of the control signal transmitted from the main body section 100. In the present embodiment, the imaging section 40 can be moved along a circular rail RL centering on a specific axis. The imaging section 40 is moved along the rail RL on the basis of the control signal by an actuator 41 (refer to FIG. 2). In the present embodiment, the real object OB1 is disposed on the specific axis, and thus the imaging section 40 can image the real object OB1 while being rotated by 360 degrees. The real object OB1 corresponds to a real object in the appended claims.

The display section 20 is a display which can display an image. The display section 20 displays an image on the basis of the control signal transmitted from the main body section 100. In the example illustrated in FIG. 1, the display section 20 displays a captured image obtained by the imaging section 40.

The operation section 30 is a user interface for receiving a user's operation. As illustrated in FIG. 1, the operation section 30 includes a keyboard KB and a mouse MS. The keyboard KB has a plurality of buttons for judging the presence or absence of determination when being pressed. The keyboard KB transmits a control signal corresponding to a pressed button to the main body section 100. The mouse MS has two buttons for judging the presence or absence of determination when positions thereof are changed and when the buttons are pressed. The mouse MS transmits control signals corresponding to a positional change and the presence or absence of determination, to the main body section 100.

Figure 2:
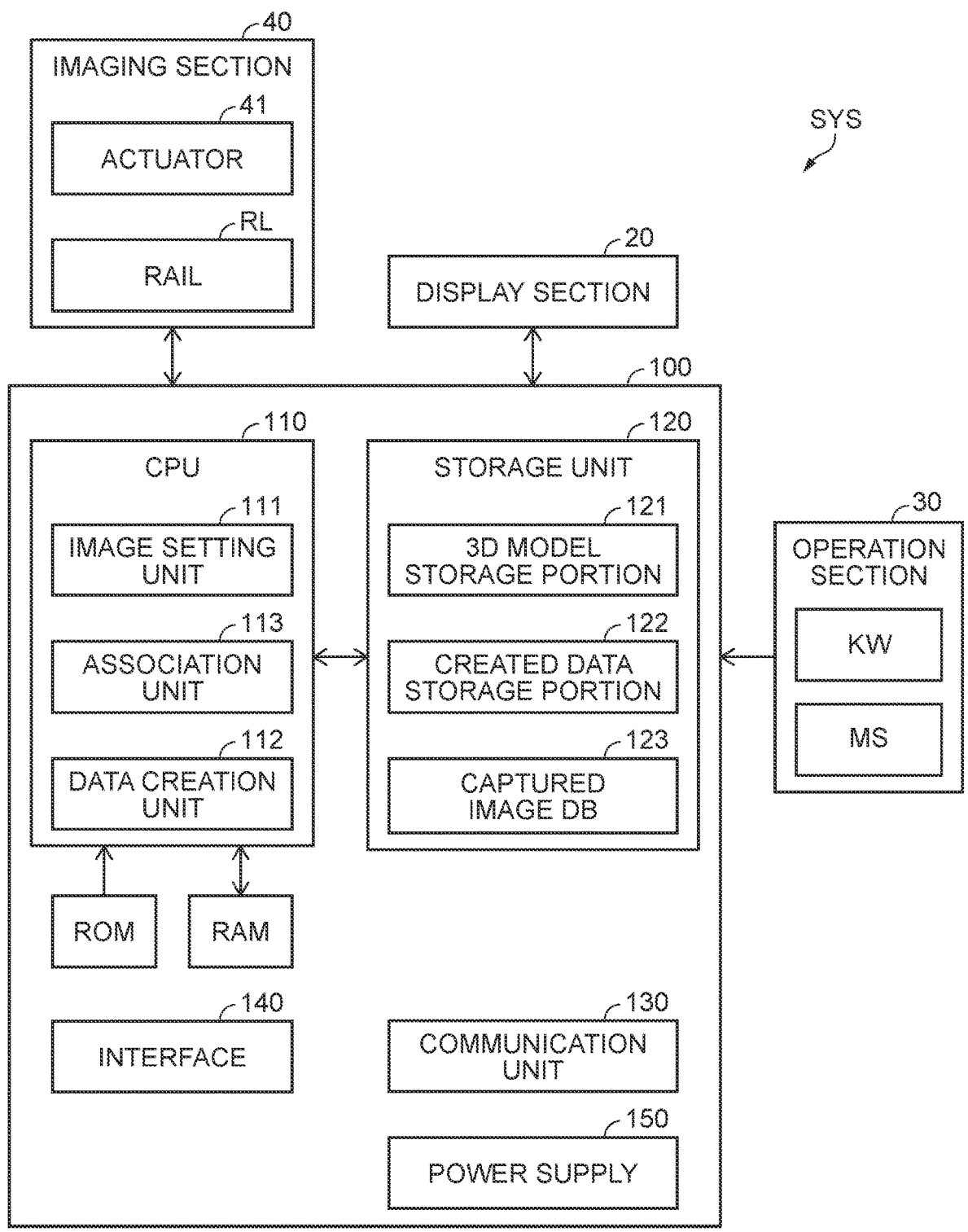
FIG. 2 is a block diagram illustrating a functional configuration of the image processing system.

FIG. 2 is a block diagram illustrating a functional configuration of the image processing system SYS. As illustrated in FIG. 2, the main body section 100 includes a CPU 110, a storage unit 120, a ROM 161, a RAM 162, a communication unit 130, an interface 140, and a power supply 150. The storage unit 120 stores various items of data, and is constituted of a hard disk drive and the like. The storage unit 120 includes a 3D model storage portion 121, a created data storage portion 122, and a captured image database 123 (captured image DB 123).

The 3D model storage portion 121 stores a 3D model (3D CAD model) created by using computer-aided design (CAD) as a 3D model corresponding to a shape and a structure of the real object OB1. The created data storage portion 122 stores data created by the CPU 110. As details of data stored in the created data storage portion 122 will be described later, the created data storage portion 122 stores association data in which 2D model data corresponding to a predetermined view of a 3D model, appearance data of the real object OB1 imaged by the imaging section 40, and the predetermined view are associated with each other. The captured image database 123 stores a captured image obtained by imaging the real object OB1 in the imaging section 40. The captured image stored in the captured image database 123 is one imaging frame of the real object OB1 imaged from a specific location, a moving image obtained by imaging the real object OB1, or the like.

The CPU 110 reads various programs from the ROM 161 and develops the programs in the RAM 162, so as to execute the various programs. The CPU 110 includes an image setting unit 111, a data creation unit 112, and an association unit 113. The image setting unit 111 sets an image displayed on the display section 20. For example, the image setting unit 111 displays an image of the real object OB1 captured by the imaging section 40, and a contour of a 2D model obtained on the basis of the 3D model of the real object OB1 stored in the 3D model storage portion 121, on the display section 20. The data creation unit 112 creates association data in which 2D model data obtained on the basis of the 3D model of the real object OB1 stored in the 3D model storage portion 121 is associated with image data (appearance data) of the real object OB1 captured by the imaging section 40. The data creation unit 112 stores the created association data in the created data storage portion 122. Details of data created by the data creation unit 112 will be described later.

The image setting unit 111 displays an image captured by the imaging section 40 on the display section 20. The image setting unit 111 displays a 2D model obtained by projecting a 3D model onto a virtual plane on the basis of a predetermined viewpoint, on the display section 20. In a case where the real object OB1 is imaged by the imaging section 40, the association unit 113 associates a contour of the imaged real object OB1 with the contour of the 2D model at a timing of receiving a predetermined command from a user, so as to estimate a pose of the imaged real object OB1. Details of estimation of a pose of the real object OB1 performed by the association unit 113 will be described later. If the association unit 113 completes estimation of the pose of the real object OB1, the image setting unit 111 displays a new 2D model obtained by projecting the 3D model by using the estimated pose. At this time, the real object OB1 and the new 2D model displayed on the display section 20 overlap each other with higher accuracy.

The power supply 150 supplies power to the respective units of the image processing system SYS. For example, a secondary battery may be used as the power supply 150. The interface 140 is an interface which connects the main body section 100 to various external apparatuses OA which are content supply sources. As the external apparatuses OA, for example, a personal computer (PC), a mobile phone terminal, and a gaming terminal may be used. As the interface 140, for example, a USB interface, a microUSB interface, and a memory card interface may be used. The data creation unit 112 may acquire captured image data of the real object OB1 via the interface 140.

The communication unit 130 performs wireless communication with other apparatuses such as a content server, a television set, and a personal computer, on the basis of a predetermined wireless communication standard such as a wireless LAN or Bluetooth (registered trademark). The data creation unit 112 may acquire captured image data of the real object OB1 and/or programs that are to be loaded into the main body section 100 and used to realize functions described in the embodiments from other servers via the communication unit 130.

A-2. Data Creation without Using Marker

The data creation unit 112 may employ data creation based on a marker and data creation without using a marker in order to associate captured image data of the real object OB1 captured by the imaging section 40 with data based on the 3D model of the real object OB1 stored in the 3D model storage portion 121. Here, the data creation without using a marker will be described, and the data creation based on a marker will be described in a second embodiment.

A-2-1. Online Data Creation

Figure 3:
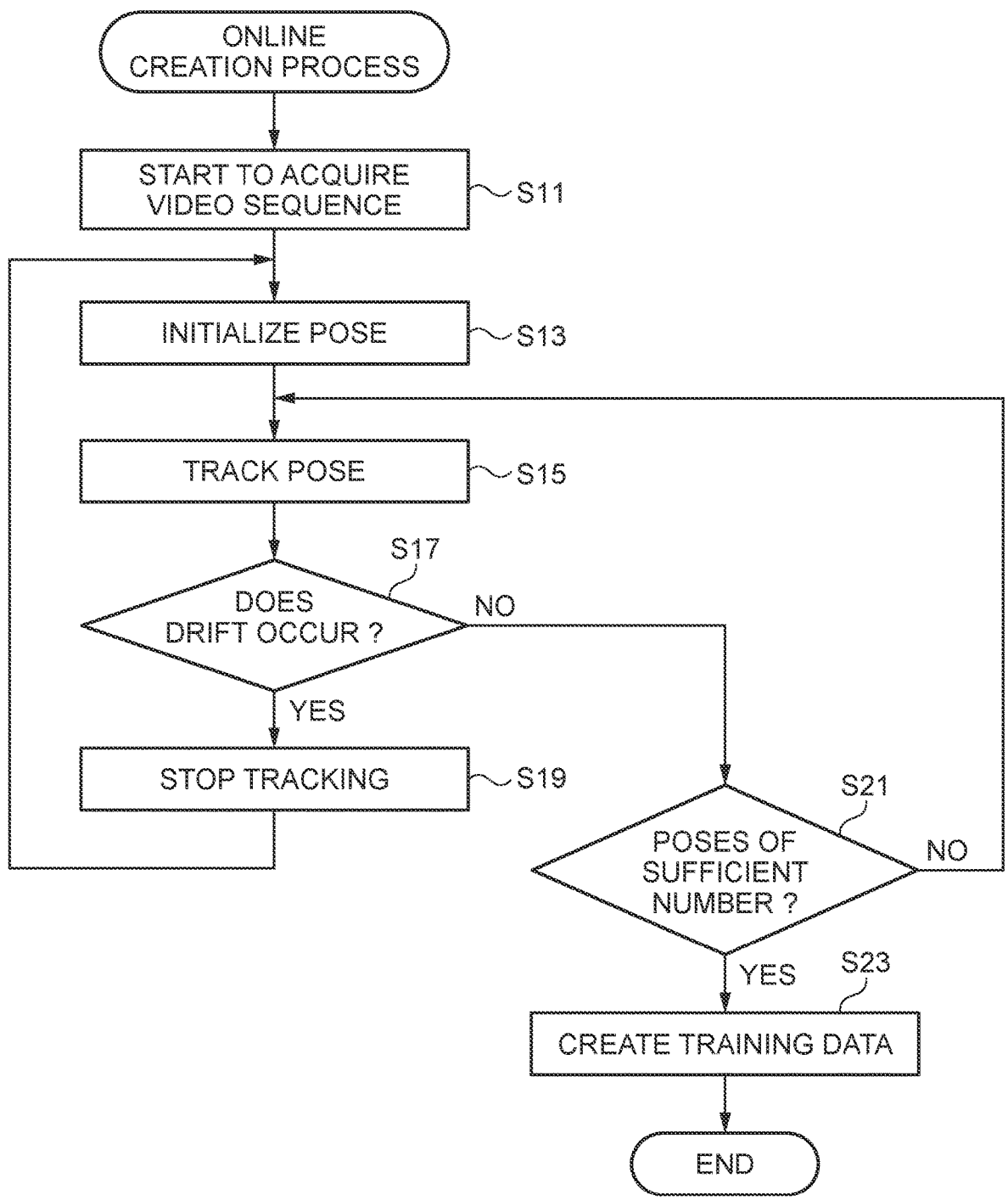
FIG. 3 is a flowchart illustrating an online creation process in which data is created online without using a marker.

FIG. 3 is a flowchart illustrating an online creation process in which data is created without using a marker online. The program for realizing the online creation process is stored in a memory medium (specifically in this embodiment, ROM 161). Data creation without using a marker includes two data creation processes such as an online creation process in which appearance data is provided to "2D model data" while imaging an object with the imaging section 40, and an offline creation process in which appearance data is provided to "2D model data" by using captured image data of the real object OB1 prepared in advance. Here, the online creation process will be described, and the offline creation process will be described later.

Pose Initialization

In the online creation process, first, the CPU 110 starts to acquire a video sequence (step S11). In the acquisition of the video sequence, the CPU 110 prompts a user to image the real object OB1 by using the imaging section 40. The image setting unit 111 displays the image of the real object OB1 on the display section 20. Simultaneously, the image setting unit 111 displays a 2D model obtained by projecting a 3D model onto a virtual plane on the basis of a predetermined view, on the display section 20. As a result, the real object OB1 imaged by the imaging section 40 and the projected 2D model are displayed so as to overlap each other on the display section 20, but, in this stage, an image contour of the real object OB1 is not aligned with a contour of the 2D model. Next, the association unit 113 performs initialization of the pose (step S13 in FIG. 3).

Figure 4:
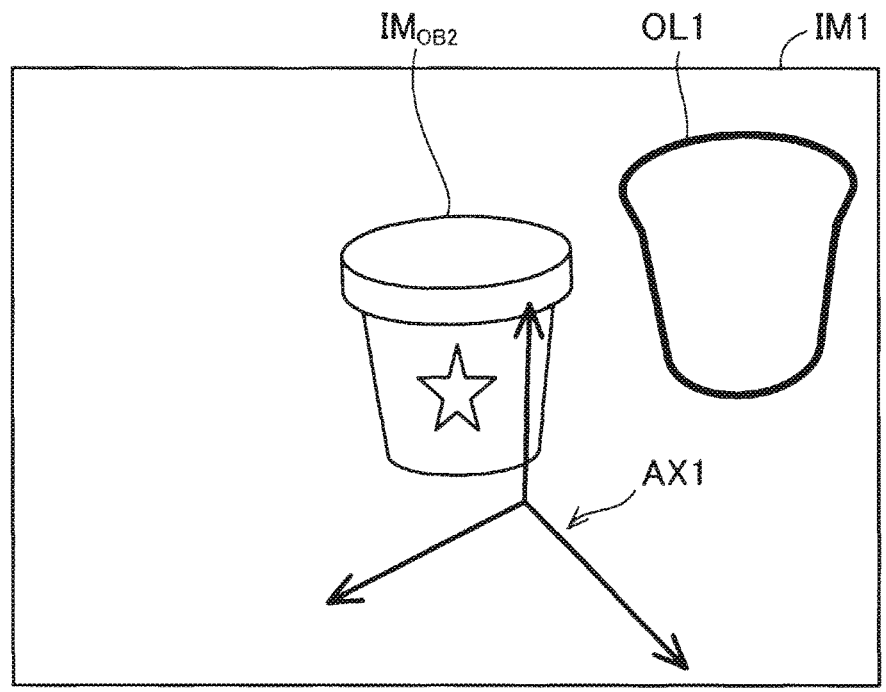
FIG. 4 is a diagram illustrating a display image in which a contour of a two-dimensional model and an image captured by an imaging section are displayed on a display section.
Figure 5:
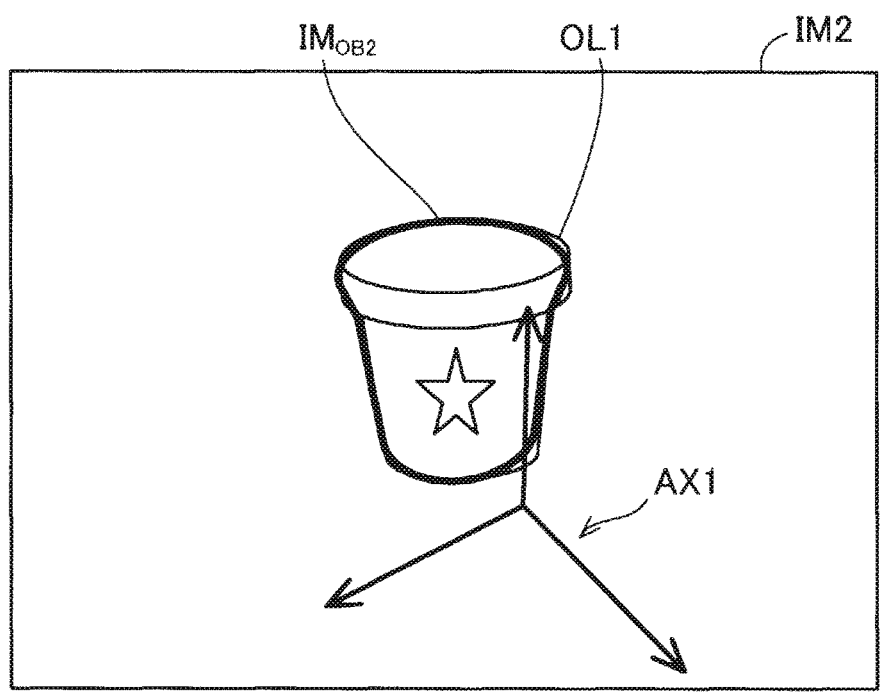
FIG. 5 is a diagram illustrating a display image in a state in which an image contour of a real object is substantially aligned with a contour of the 2D model.

FIG. 4 is a diagram illustrating a display image IM1 in which a contour OL1 of the 2D model and an image captured by an imaging section 40 are displayed on the display section 20. As illustrated in FIG. 4, the image of the real object CM captured by the imaging section 40 and displayed on the display section 20 is not aligned with the contour OL1 of the 2D model displayed on the display section 20. Thus, in the pose initialization process, the image setting unit 111 prompts the user to move the imaging section 40 so that the image contour of the real object OB1 is substantially aligned with the contour of the 2D model. The user is prompted to input a predetermined command to the operation section 30 in a case where the image contour of the real object OB1 is aligned with or substantially aligned with the contour of the 2D model. Coordinate axes AX1 illustrated in FIGS. 4 and 5 and the subsequent drawings are coordinate axes fixed to the real object OB1, and change depending on a change in a pose of the real object OB1 relative to the imaging section 40.

In a case where the operation section 30 receives the predetermined command, the association unit 113 searches on the image for image points corresponding to 2D model points included in the contour of the 2D model. Here, the 2D model points included in the contour of the 2D model may be selected in advance so as to be uniformly distributed along a contour line representing the 2D model. The image point corresponding to the 2D model point may be searched for by, for example, the CPU 110 selecting an image point having luminance gradient close to luminance gradient of the 2D model point from among a plurality of image points included in a region of neighborhood (for example, a pixel matrix of 3×3) centering on the 2D model point. The CPU 110 may compare two gradients with each other on the basis of an inner product between two vectors.

The association unit 113 optimizes a pose represented by a rigid body conversion matrix included in view parameters on the basis of the view and the depth map so that re-projection errors are minimized on a virtual plane (in this case, a plane corresponding to an imaging surface of the imaging section 40) on the basis of 3D model points obtained by inversely converting the 2D model points, and image points corresponding to the 2D model points. Optimization, that is, refinement of the pose is performed through iterative computations using, for example, the Gauss-Newton method. If the pose is optimized (refined), the image contour and the contour of the 2D model are aligned with each other on the display section 20 with higher accuracy. The above process is also referred to as "pose initialization". A pose represented by a view where the two contours are aligned with each other substantially matches the pose of the real object OB1 relative to the imaging section 40. Image information of the real object OB1 in the captured image is stored as appearance data in association with the pose. The appearance data according to the present embodiment includes texture information (information regarding an appearance such as an edge, a pattern, or a color) of an outer surface of the real object OB1 imaged by the imaging section 40 in the pose. An image point corresponding to the 2D model point is searched for by comparing detected edges with each other, but a well-known technique is applicable to edge detection, and, in other embodiments, an image point corresponding to a projected 2D model point may be searched for according to methods (for example, corner detection) other than the edge detection. In a case where the pose has been refined in the pose initialization, the CPU 110 may present information indicating that pose refinement is completed to the user via the display section. For example, the CPU 110 may change a color of the 2D model displayed on the display section 20 so as to present completion of the pose refinement to the user.

Pose Tracking

If the "pose initialization" is completed, the CPU 110 starts a process of tracking the pose of the real object OB1 (step S15). The pose tracking process according to the present embodiment is based on tracking of features (feature points) on the real object OB1 appearing in a captured image acquired by the imaging section 40. If preparation of the pose tracking process is completed, the CPU 110 prompts the user to move the imaging section 40 relative to the real object OB1. While the imaging section 40 is relatively being moved, a pose of the real object OB1 relative to the imaging section 40 is tracked by the CPU 110. The CPU 110 projects the 3D model onto the virtual plane by using the same pose as a pose of the real object OB1 updated through the tracking. Thus, even if the user moves the imaging section 40 while imaging the real object OB1, an image contour of the real object is kept substantially aligned with a contour of the 2D model on the display section 20.

In a case where a spatial relationship (a pose relative to the imaging section 40) between the imaging section 40 and the real object OB1 becomes a predetermined spatial relationship, the CPU 110 acquires image information of the real object OB1 in the spatial relationship as appearance data. The acquired appearance data is stored in association with the spatial relationship (pose) and "2D model data" in the pose. The "2D model data" includes at least one of an image representing a contour (contour line) of the 2D model and "contour feature information" representing the contour. The "contour feature information" includes locations of 2D model points included in the contour and luminance gradients at the locations.

Figure 7:
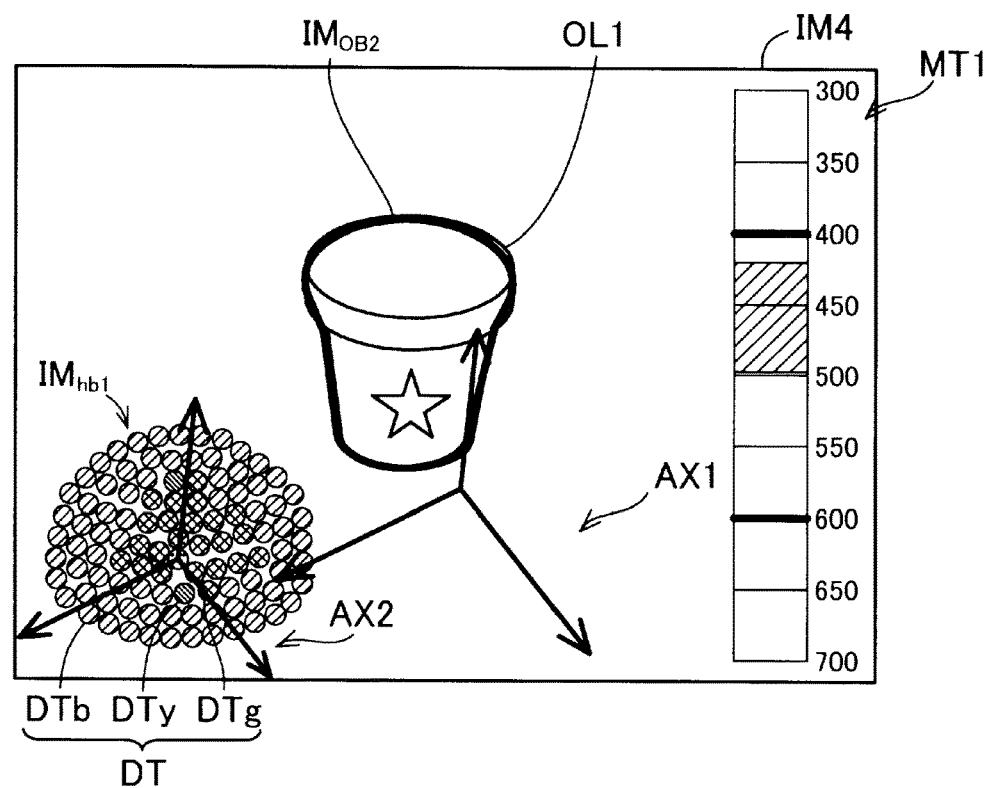
FIG. 7 is a diagram illustrating a display image displayed on the display section while a CPU is tracking a process of a real object.
Figure 8:
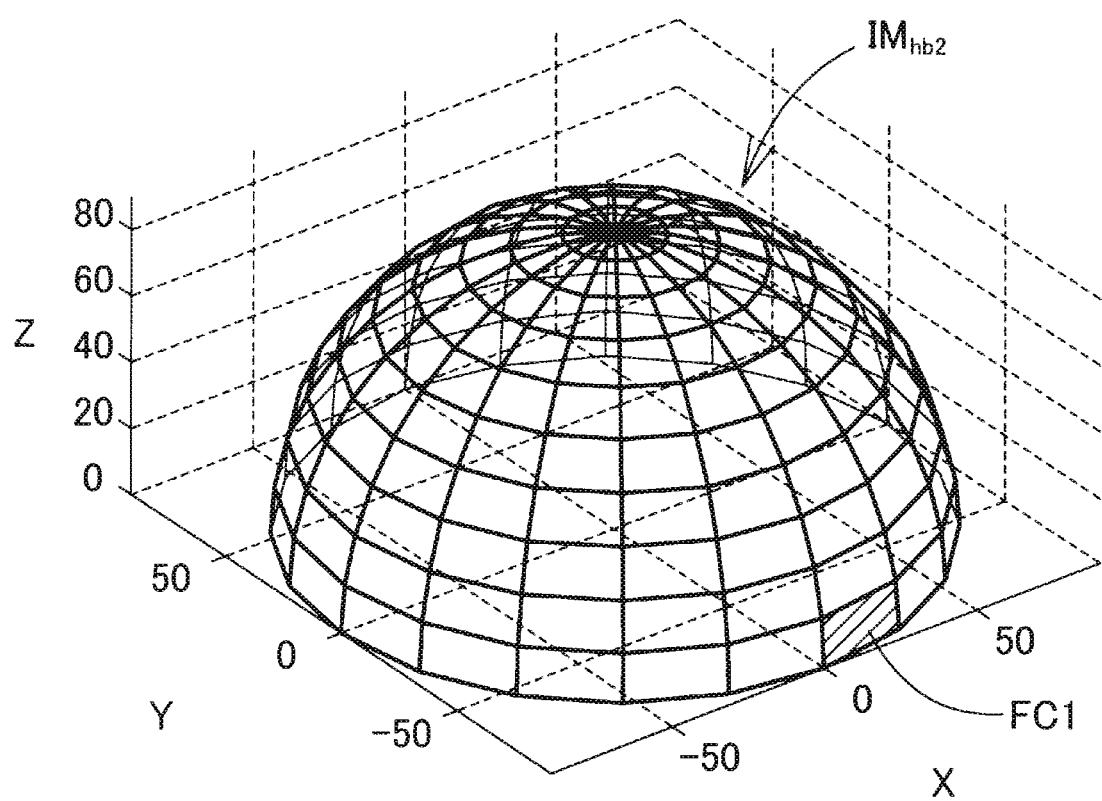
FIG. 8 is a diagram illustrating details of respective dots forming a hemisphere image.

FIG. 7 illustrates a display image IM4 for prompting the user to image the real object OB1 in the predetermined spatial relationship. In FIG. 7, the spatial relationships are expressed by a plurality of dots DT included in the display image IM4. The dots DT are distributed on a surface of a hemisphere illustrated in FIG. 8. XYZ axes of a coordinate system AX2 (FIG. 7), AX3 (FIG. 12) and AX4 (FIG. 13) of the hemisphere $IM_{hb1}$ (FIG. 7), $IM_{hb2}$ (FIG. 8) and $IM_{hb3}$ (FIG. 13) are represented in an object coordinate system, and the origin thereof corresponds to a point on the real object OB1 or the 3D model. A region FC1 that forms a part of the surface of the hemisphere image $IM_{hb2}$ corresponds to a dot. Similarly, other regions on the surface correspond to respective dots.

The dots DT in the display image IM4 change in three colors. A blue dot DTb indicates a state in which appearance data of the real object OB1 has not been obtained yet in the spatial relationship represented by the dot DTb. A green dot DTg indicates that appearance data has been obtained in the spatial relationship represented by the dot DTg. A yellow dot DTy indicates that more appearance data is required to be obtained in the spatial relationship represented by the dot DTy. In other words, if all the dots DT change from the blue dots DTb to the green dots DTg, this notifies the user that appearance data of the real object OB1 has been acquired in all of the predetermined spatial relationships. In the present embodiment, the "location" includes the concept of "orientation", and, thus, even if coordinate values of the imaging section 40 do not change, a state in which an orientation of an optical axis of the imaging section 40 changes is also referred to as a state in which a location of the imaging section 40 changes.

Figure 6:
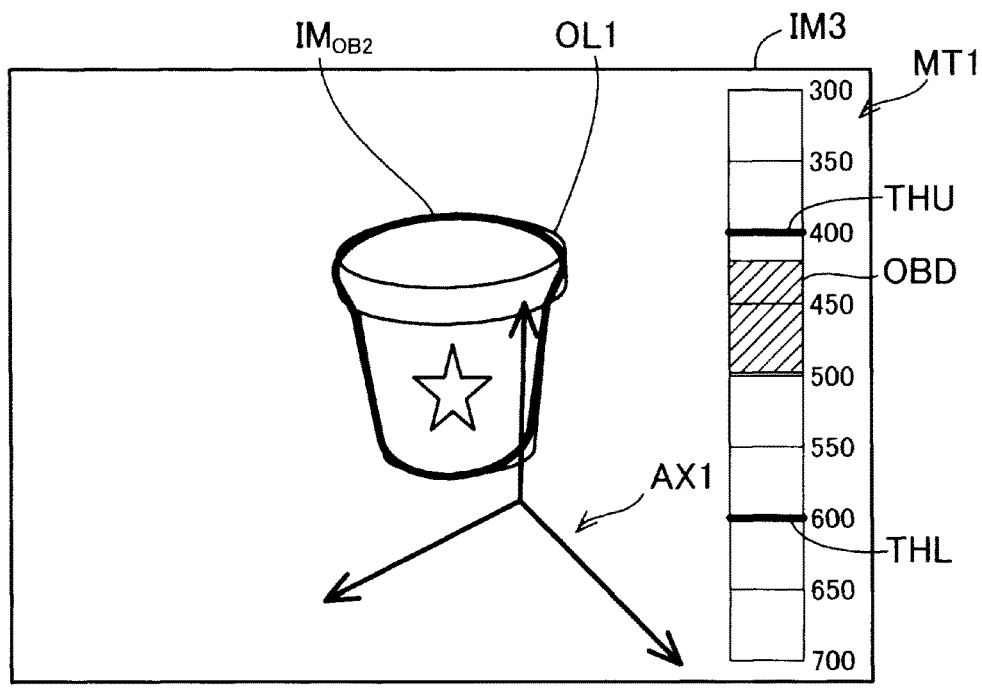
FIG. 6 is a diagram illustrating a display image which is displayed on the display section in a case where an object distance is compared with a preset threshold value.

In order to cause the user to recognize a distance between the imaging section 40 and the real object OB1 in the predetermined spatial relationship, a display image IM3 illustrated in FIG. 6 may be displayed. As illustrated in FIG. 6, in the display image IM3, a meter MT1 is further displayed on the display section 20 compared with the display image IM2 illustrated in FIG. 5. The meter MT1 is an image indicating a distance (hereinafter, referred to as an object distance) between the imaging section 40 and the real object OB1. The meter MT1 includes a threshold value upper limit THU, a threshold value lower limit THL, and an object distance OBD (hatched region). The threshold value upper limit THU indicates an upper limit of a preset range of threshold values. The threshold value lower limit THL indicates a lower limit of the preset range of threshold values. The object distance OBD indicates an object distance included in a spatial relationship specified by the data creation unit 112. The reason why the object distance OBD indicates a predetermined range is that a distance specified by the data creation unit 112 has a predetermined width.

If template data created through the above-described process is used, in a case where the real object OB1 is detected by using an HMD (head-mounted display device), and an AR object is rendered on the real object OB1, spatial relationships are diversified, or increased, in which a pose of the real object OB1 can be initially detected or initially estimated with high accuracy by using a camera of the HMD.

Stoppage of Pose Tracking

In a case where features of the real object OB1 vanishes or motion blurring occurs in a captured image acquired by the imaging section 40 during pose tracking, a tracked pose may be drifted. In this case, tracking of a pose may be stopped. Pose initialization is preferably performed again in the pose whose tracking is stopped. Then, a pose at the time of acquiring appearance data and a pose at the time of projecting a 3D model to obtain a 2D model are kept matched each other with high accuracy over a plurality of poses (spatial relationships) to be sampled.

Therefore, if the process in step S15 in FIG. 3 is completed, the data creation unit 112 determines whether or not a pose is drifted during tracking of a pose (step S17). The determination may be performed by a user input on the basis of observation performed by the user, or through analysis in the CPU 110 based on tracking. In a case where the data creation unit 112 determines that drift is detected (YES in step S17), the data creation unit 112 stops pose tracking (step S19) and returns to step S13 so as to perform pose initialization again since there is a concern that an accurate pose of the real object CM may not be specified.

In a case where it is determined that drift is not detected in the process in step S17 (NO in step S17), the data creation unit 112 determines whether or not a sufficient amount of appearance data of the real object OB1 has been acquired (step S21). In the present embodiment, in a case where all of the dots DT forming a hemisphere image $IM_{hb1}$ illustrated in FIG. 7 change to the green dots DTg, the data creation unit 112 determines that a sufficient amount of appearance data of the real object OB1 has been acquired. The hemisphere image $IM_{hb1}$ is associated with the coordinate axes AX2.

In a case where it is determined that a sufficient amount of appearance data of the real object OB1 has not been acquired in the process in step S21 of FIG. 3 (NO in step S21), the data creation unit 112 successively repeatedly performs processes in step S15 and the subsequent steps. In a case where it is determined that a sufficient amount of appearance data of the real object OB1 has been acquired in the process in step S21 (YES in step S21), the data creation unit 112 finishes tracking of a pose of the real object OB1, creates association data (also referred to as a template or training data) in which a spatial relationship (pose), the appearance information of the real object OB1 in the spatial relationship, and the 2D model data are associated with each other (step S23), and finishes the online creation process. The data creation unit 112 stores the created association data (also referred to as template data) in the created data storage portion 122.

As mentioned above, in the image processing system SYS of the present embodiment, the data creation unit 112 substantially overlaps the image contour $IM_{OB2}$ of the real object OB1 and the contour OL1 of the 2D model displayed on the display section 20 with each other, in response to an operation received via the operation section 30. The data creation unit 112 creates association data in which a spatial relationship between the imaging section 40 and the real object OB1 at that time, the appearance data of the real object OB1 imaged by the imaging section 40 in the spatial relationship, and the 2D model data are associated with each other. The data creation unit 112 stores the created association data in the created data storage portion 122. Thus, according to the image processing system SYS of the present embodiment, appearance data acquired on the basis of captured image data can be provided to a template which is obtained on the basis of a 3D model (for example, a 3D CAD model) not having appearance data (texture information) which is information regarding an appearance of an outer surface of an object. Through this association, the template has the texture information (surface appearance data) obtained on the basis of the captured image in addition to feature information (for example, contour information) obtained on the basis of the 3D model. The HMD refers to the template having the surface appearance data when detecting the real object OB1 and estimates a pose thereof, and thus the detection accuracy of an initial pose of the real object OB1 can be improved compared with a case of referring to a template not having the appearance data. In the image processing system SYS of the present embodiment, if the imaging section 40 can image the real object OB1, the data creation unit 112 can create a template (association data), and thus it is possible to create a template (association data) having appearance data without using a complex device.

A-2-2. Offline Data Creation

An offline data creation process is different from the online data creation process in terms of "pose tracking".

Figure 9:
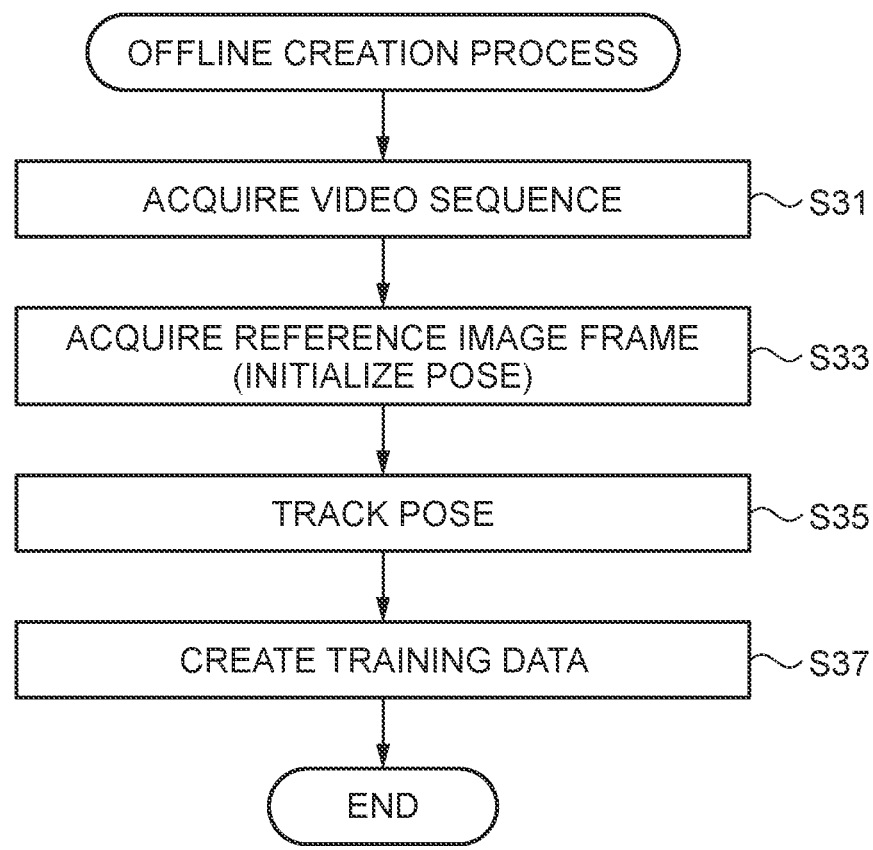
FIG. 9 is a flowchart illustrating an offline creation process.

FIG. 9 is a diagram illustrating a flow of the offline creation process. The program for realizing the offline creation process is stored in a memory medium (specifically in this embodiment, ROM 161). In the offline creation process, first, the CPU 110 performs acquisition of a video sequence (step S31). In the performed acquisition of the video sequence, a user images the real object OB1 with the imaging section 40 in advance. At this time, the imaging section 40 is relatively moved so that poses of the real object OB1 relative to the imaging section 40 correspond to all spatial relationships represented by the dots in FIG. 7 or 8. The CPU 110 records the video sequence of the real object OB1 through the imaging in the imaging section 40. The CPU 110 selects an image frame in which the real object OB1 having a pose close to a pose represented in a predetermined view is imaged, from among image frames forming the video sequence. Regarding a method of selecting an image frame that is also referred to as a reference image frame in the present embodiment, the image frame may be automatically selected in image processing performed by the CPU 110, and may be selected by the user. A pose of the real object OB1 in the selected image frame is estimated. A method of estimating a pose may be the same as the method described in the process related to the online data creation process.

Next, the CPU 110 acquires a reference image frame (step S33). A pose of the real object OB1 imaged in each of the image frames in the preceding and succeeding of the time axis with respect to the selected image frame is tracked (step S35). In this case, bundle adjustment is locally or entirely applied to the reference image frame, and thus estimation of the pose of the real object OB1 is refined with respect to each image frame. The appearance data of the real object OB1 is acquired and is recorded at a predetermined timing. Training data is created in which the acquired appearance data is associated with the pose, and "2D model data" of the 2D model obtained by projecting the 3D model in the pose (step S37), is stored as a template, and the offline creation process is finished.

As described above, in the image processing system SYS of the present embodiment, the data creation unit 112 uses a video sequence recorded by imaging the real object OB1 in advance, as captured image data of the real object OB1, when creating association data in the offline creation process. Therefore, in the offline creation process, when the data creation unit 112 estimates a pose of the real object OB1, an image frame to which bundle adjustment is applied is used, and thus estimation of a pose can be refined. The data creation unit 112 can partially solve the problem of the occurrence of drift by using such image frames.

B. Second Embodiment

In a second embodiment, in a case where a preset marker is present in an imaging region of the imaging section 40 in addition to an object, the imaging section 40 performs estimation and tracking of a pose of the real object OB1 with a coordinate axis set in the marker as a reference.

B-1. Configuration of Image Processing System

Figure 10:
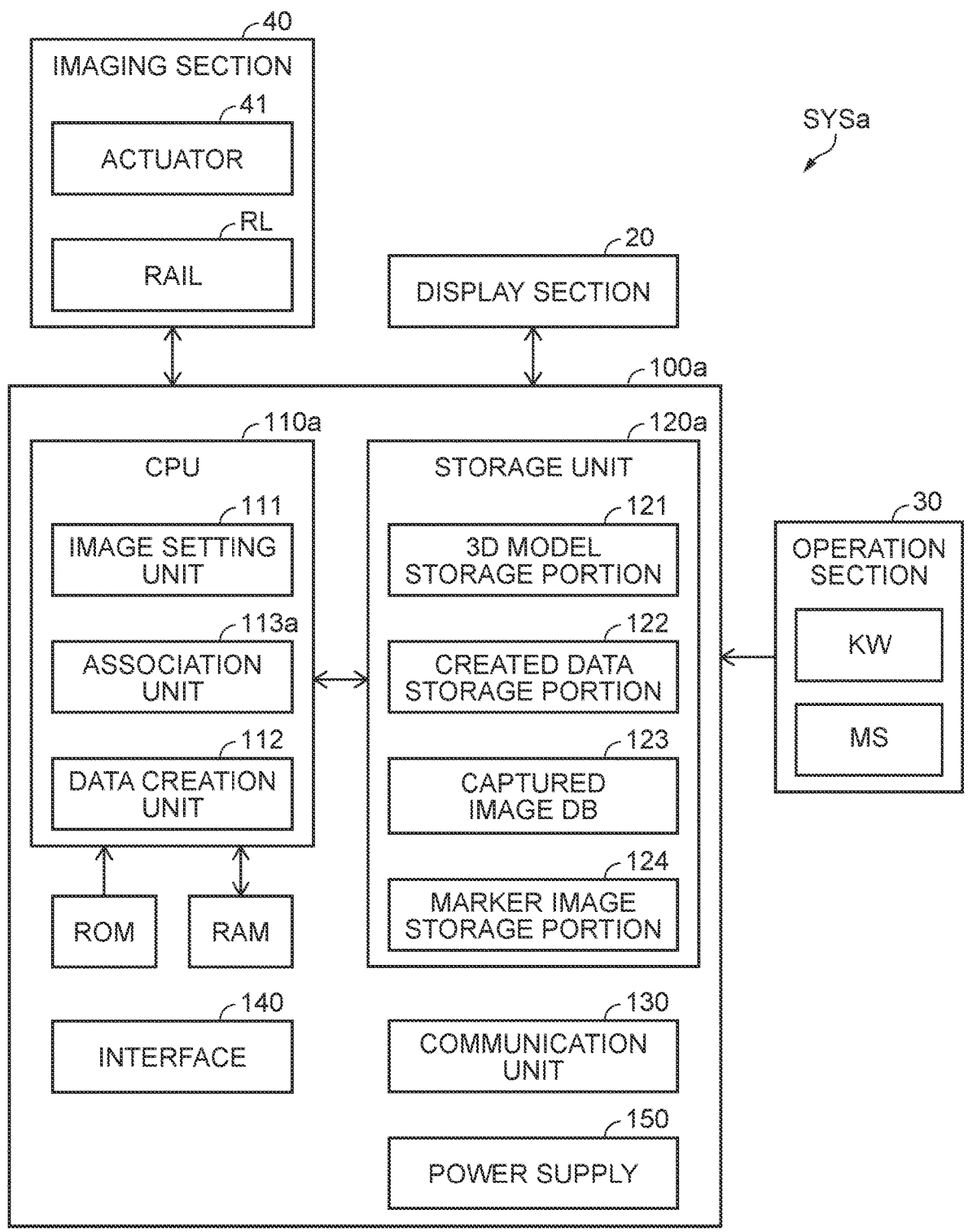
FIG. 10 is a block diagram illustrating a functional configuration of an image processing system in a second embodiment.

FIG. 10 is a block diagram illustrating a functional configuration of an image processing system SYSa in the second embodiment. The image processing system SYSa of the second embodiment is different from the image processing system SYS of the first embodiment in that a storage unit 120a includes a marker image storage portion 124, and an association unit 113a of a CPU 110a performs different processes. Thus, in the second embodiment, the same constituent elements as those of the image processing system SYS of the first embodiment will not be described.

The marker image storage portion 124 of the storage unit 120a stores a preset marker model. The marker model represents a plane marker, but a marker coordinate system is represented by three axes (an X axis, a Y axis, and a Z axis) which are orthogonal to each other.

B-2. Data Creation Based on Marker
Pose Initialization

Figure 11:
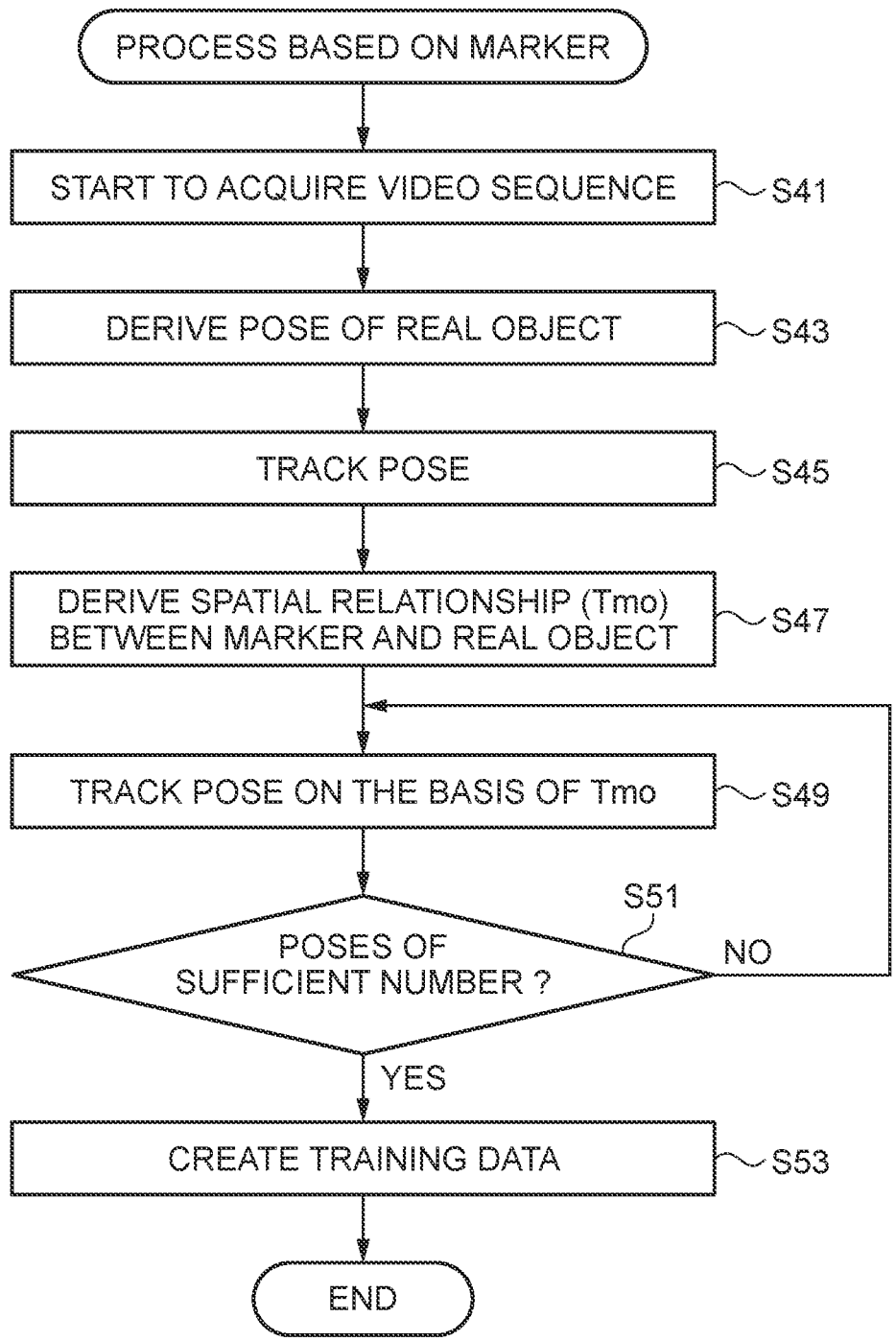
FIG. 11 is a flowchart illustrating an online creation process in which data is created on the basis of a marker online in the second embodiment.
Figure 12:
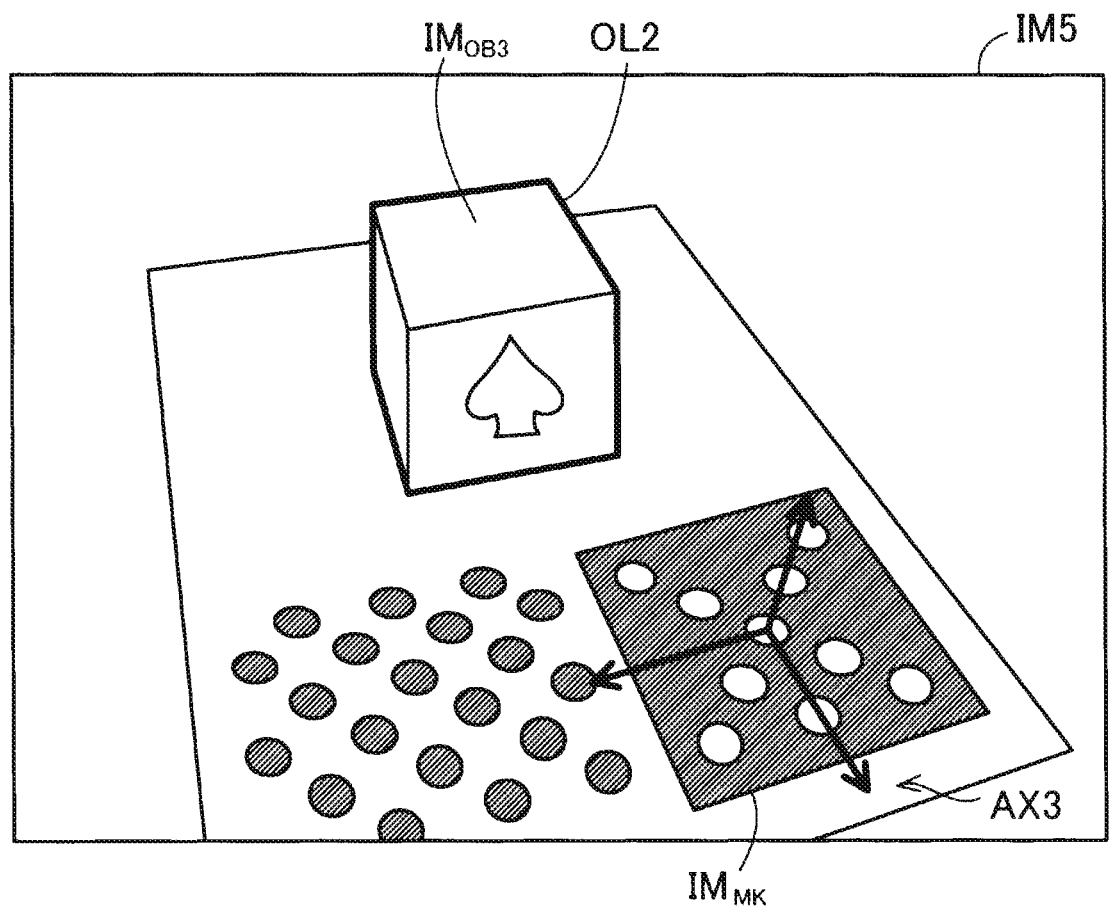
FIG. 12 is a diagram illustrating a display image including coordinate axes, displayed on a display section in a case where an imaging section captures a marker image.
Figure 13:
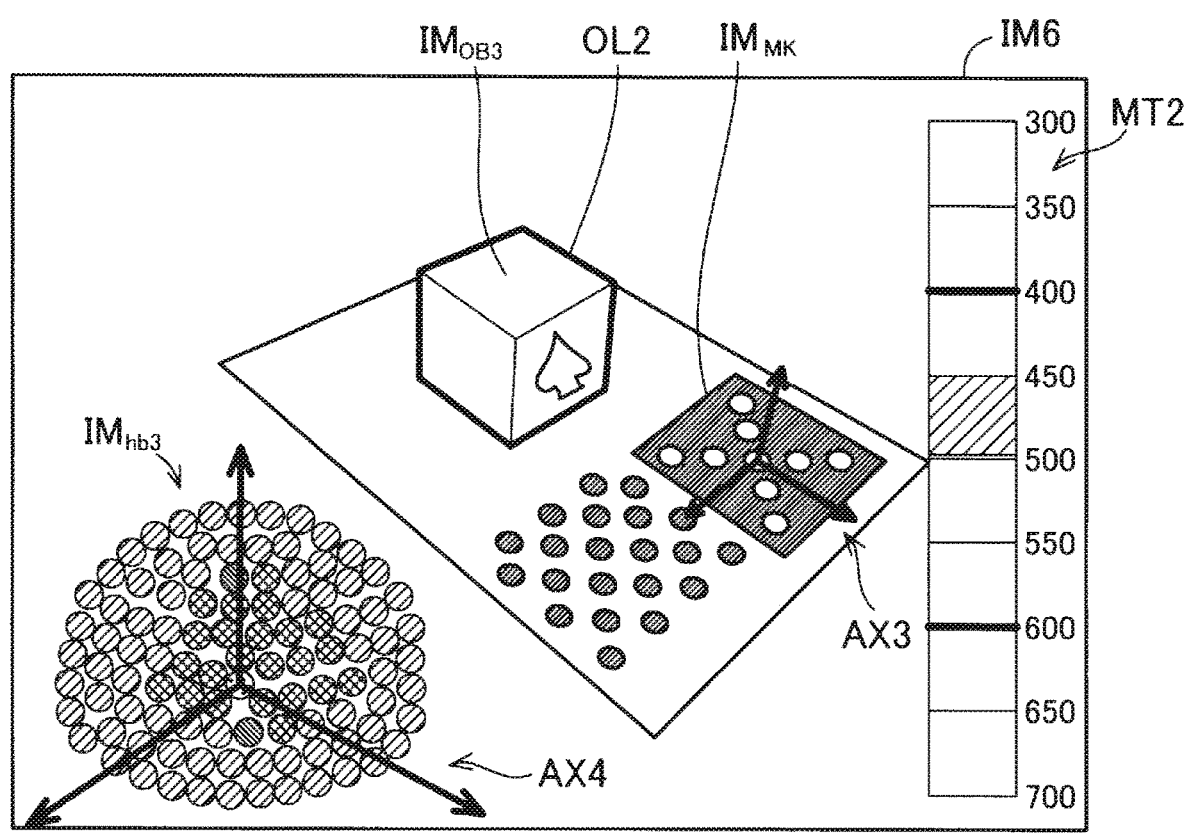
FIG. 13 is a diagram illustrating a display image displayed on the display section while the imaging section is tracking a pose of an object.

FIG. 11 is a diagram illustrating a flow of a process based on a marker $IM_{MK}$ (FIGS. 12 and 13) in the second embodiment. Programs used to realize the process flow are stored in a memory medium (specifically in the embodiment, ROM 161). FIG. 12 shows a display image IM5. The display image IM5 includes coordinate axes AX3 that are displayed on the display section 20 when the imaging section 40 images a marker image IMMK. In the same method as in the first embodiment, in a case where a command is received from the user, the CPU 110a starts to acquire a video sequence (step S41), and derives a pose of the real object OB1 about each image frame of the video sequence (step S43). For example, in the same method as the method described in the first embodiment, the user may align an image contour $IM_{OB3}$ of the real object OB1 with a contour OL2 of a 2D model obtained on the basis of a 3D model corresponding to the real object OB1, and then the CPU 110a may estimate a pose of the real object OB1 by deriving (optimizing) view parameters which minimize re-projection errors between image points and 2D model points corresponding to each other (FIGS. 12 and 13).

The CPU 110a may compute a reliability score for the derived pose, and may notify the user of the score via the UI. The user may accept the pose or may perform the process again in step S43 on the basis of the score. Unlike the method not using a marker described in the first embodiment, the estimated pose at this step is not included in training data (template).

The user keeps relatively moving the imaging section 40 around the real object OB1 so as to collect video sequences from various angles and to continuously record the video sequences. During that time, the CPU 110a tracks a pose of the real object and continuously records the pose (step S45). If sufficient images are collected, the CPU 110a calls (activates) a multiview improvement algorithm (AutoFit) provided as a function of the PGE tool so as to perform the following process in response to a command from the user. First, the CPU 110a obtains a pose of the plane marker relative to the imaging section 40 with respect to each image frame included in the video sequence. In the present embodiment, a pose of the plane marker is derived according to a method using a homography matrix. Generally, acquiring a 3D pose of the plane marker with high accuracy is easier than acquiring a 3D pose of any 3D object with high accuracy. An accurate pose (this pose is indicated by Tmo; here, the suffix o indicates an object coordinate system, the suffix m indicates a marker coordinate system, and T indicates a conversion matrix between both of the coordinate systems) between the plane marker and the real object by using each tracked pose of the real object OB1 and a pose of the plane marker included in each same image frame is estimated (step S47). The above-described steps S41 to S47 correspond to the pose initialization of the first embodiment.

Thereafter, even if the user moves the imaging section 40 relative to the real object OB1, it is possible to track a pose of the real object OB1 with higher accuracy on the basis of the pose of the plane marker $IM_{MK}$ and the pose Tmo between the plane marker and the real object OB1 (step S49). A 2D model obtained by projecting a 3D model onto a virtual plane on the basis of a predetermined pose is displayed so as to overlap the video sequence in the same method as the method described in the first embodiment, and the user aligns an image contour $IM_{OB3}$ of the real object OB1 with a contour OL2 of the 2D model by operating the mouse or the like. In a case where the image contour $IM_{OB3}$ of the real object OB1 is substantially aligned with the contour OL2 of the 2D model, the CPU 110a stores appearance data in the pose and "2D model data" in the pose in association with each other. Alignment between the image contour $IM_{OB3}$ of the real object and the contour OL2 of the 2D model in the CPU 110a may be determined on the basis of completion of deriving (optimization) of view parameters which minimize re-projecting errors between image points and 2D model points corresponding to each other, and/or may be determined on the basis of an instruction from the user based on naked eye observation when the optimization cannot be used. In the same manner as in the first embodiment, with respect to all poses represented by the dots DT in FIGS. 7 and 8, a pose of the real object OB1, appearance data in the pose, and "2D model data" in the pose are stored in association with each other. In a case where association data items are stored with respect to a predetermined number of poses (YES in step S51), the association data items are collected and stored as association data (training data) (step S53), and the process based on a marker is finished. In a case where association data items are not stored with respect to a predetermined number of poses (NO in step S51), the process returns to step S49, and the CPU 110a prompts the user to keep relatively moving the imaging section 40. As described in the first embodiment, the "2D model data" mentioned here includes at least one of an image representing a contour (contour line) of the 2D model and "contour feature information" representing the contour.

C. Modification Examples

The invention is not limited to the above-described embodiments, and may be implemented in various aspects within the scope without departing from the spirit thereof. For example, the following modification examples may also occur.

C-1. Modification Example 1

In the first embodiment, during online data creation, the user relatively moves the imaging section 40 so that a captured image of the real object OB1 overlaps a 2D model obtained by projecting a 3D model corresponding to a shape of the real object OB1 onto a virtual plane on the basis of a predetermined view (pose). Instead of such a method, the following method may be employed.

First, the user images a single still image of the real object OB1 by using the imaging section 40 in any pose of the real object OB1. The CPU 110 displays the imaged real object OB1 on the display section 20. The CPU 110 displays a contour based on a 2D model obtained by projecting a 3D model onto a virtual plane corresponding to a shape of the real object OB1 on the basis of a predetermined (default) view, on the display section 20. As a result, the contours of the real object OB1 and the 2D model are displayed so as to overlap each other, but, in this stage, typically, the image contour of the real object OB1 and the contour of the 2D model are not aligned with each other.

The CPU 110 prompts the user to adjust the view in which the 3D model is projected so that the image contour of the real object OB1 and the contour of the 2D model are aligned with each other. Specifically, the user updates rotations about the three axes and translations along the three axes included in the view by using an interface such as a mouse or a touch pad. The CPU 110 displays a 2D model obtained by projecting the 3D model onto a virtual plane on the basis of a new view including the updated rotation and translation, on the display section 20. The CPU 110 displays predetermined text on the display section 20 and thus prompts the user to align the image contour of the real object OB1 and a contour of the 2D model, displayed on the display section 20, with each other via operations of the mouse or the like. The CPU 110 prompts the user to notify the CPU 110 of a timing at which the image contour of the real object OB1 is aligned with the contour of the 2D model via a predetermined interface. The CPU 110 activates an algorithm for minimizing re-projection errors between image points in the still image and projected 2D model points with the three rotations and the three translations at the time of receiving the notification as an initial pose representing a pose of the real object OB1, and refines an estimated pose of the real object OB1. If the pose is refined, the image contour of the real object OB1 is aligned with the contour of the 2D model with higher accuracy on the display section 20. In this case, the CPU 110 may present information indicating that refinement of a pose is completed to the user via the display section. For example, the CPU 110 may present completion of refinement of a pose to the user by changing a color of the 2D model displayed on the display section 20.

The CPU 110 stores appearance data of the real object OB1 and "2D model data" corresponding to the pose in the storage unit in association with each other. According to the present modification example, the appearance data of the real object OB1 is added to a template with respect to only one spatial relationship between the imaging section 40 and the real object OB1. If template data created through the above-described process is used, in a case where an HMD detects the real object OB1 with its camera, the HMD can initially estimate a pose of the real object OB1 with high accuracy by using the camera and an AR object is rendered so as to correspond to the real object OB1.

C-2. Modification Example 2

In the first and second embodiments, the image processing system SYS is used as an information processing system creating association data, but a system creating association data may be variously modified. For example, the system may be a head mounted display (HMD) provided with the imaging section 40. The method or computer program used in the system SYS described in the first or second embodiments may also be used for training a robot having an arm and a hand to grab and/or move an object. In the first embodiment, the number of imaging section 40 is one, but the real object OB1 may be imaged by using a plurality of imaging sections 40. Regarding a method of the imaging section 40 imaging the real object OB1, a location of the imaging section 40 may be fixed without changing the location of the imaging section 40, and then the real object OB1 may be moved. For example, the real object OB1 may be disposed on a turntable which can be rotated, and the real object OB1 may be imaged by the imaging section 40 whose location is fixed. Both of the imaging section 40 and the real object OB1 may be moved.

In the first embodiment, the imaging section 40 images the real object OB1, and the data creation unit 112 optimizes a pose of the imaged real object OB1 and a pose of the 3D model stored in the 3D model storage portion 121 by using a video sequence obtained in parallel to the imaging, but such a video sequence is not necessarily required to be used. The data creation unit 112 may optimize matching between poses after a series of video sequences is acquired by the imaging section 40 and is stored in the storage unit. The data creation unit 112 does not necessary require a video sequence in which the whole periphery of the real object OB1 is imaged. For example, if there is the image $IM_{OB2}$ of the real object OB1 imaged from one specific viewpoint, the data creation unit 112 may create association data viewed from the one specific viewpoint.

The appearance data of the real object, acquired by the imaging section 40 in the present specification is data including at least one of pieces of information which are not included in the 3D model stored in the 3D model storage portion 121. The texture information (a pattern, a color, and a feeling of roughness or texture) has been described as an example of appearance data, but appearance data is not limited to this information.

The invention is not limited to the above-described embodiments or modification examples, and may be implemented using various configurations within the scope without departing from the spirit thereof. For example, the embodiments corresponding to technical features of the respective aspects described in Summary of Invention and the technical features in the modification examples may be exchanged or combined as appropriate in order to solve some or all of the above-described problems, or in order to achieve some or all of the above-described effects. In addition, if the technical feature is not described as an essential feature in the present specification, the technical feature may be deleted as appropriate. The invention may also be applicable to robotics fields.

The entire disclosure of Japanese Patent Application No. 2016-075092, filed on Apr. 4, 2016, is expressly incorporated by reference herein.

What is claimed is:

1. A method for generating training data for object detection performed by a processor, the method comprising:
    obtaining image data of a real object captured by a camera;
    obtaining a first 2D model from a projection of a 3D model corresponding to the real object based at least on a first pose;
    aligning a contour of the real object in the image data and a contour of the first 2D model so as to derive a second pose of the real object;
    obtaining a second 2D model of the 3D model based on at least the second pose;
    obtaining and associating (i) appearance data of the real object in the second pose, (ii) 2D model data of the second 2D model of the 3D model in the second pose, and (iii) the second pose; and
    storing the appearance data of the real object, the 2D model data of the second 2D model, and the second pose into a memory.

2. The method according to claim 1, further comprising:
    presenting a user interface for adjusting the view so that the real object and the first 2D model are displayed so as to be substantially aligned with each other by the display device.

3. The method according to claim 2, wherein the captured image data represents a still image of the real object.

4. The method according to claim 1, further comprising:
refining the view after the real object and the first 2D model are displayed so as to be substantially aligned with each other by the display device, wherein
the appearance data of the real object and refined data of the first 2D model obtained from a projection of the 3D model based at least on the refined view are stored in the memory, with the appearance data and the refined data being associated with each other.

5. The method according to claim 1, further comprising:
tracking at least one third pose of the real object based at least on the captured image data after the real object and the first 2D model are displayed so as to be substantially aligned with each other by the display device; and
obtaining a third 2D model from a projection of the 3D model based at least on the view that corresponds to the tracked pose, wherein
the appearance data of the real object and the data of the third 2D model are stored in the memory with the appearance data and the data of the third 2D model being associated with each other, with respect to a plurality of the tracked poses.

6. The method according to claim 1, wherein
the camera provides, as the captured image data, a video sequence which is obtained while the camera is being moved relative to the real object,
the method further comprising steps of:
deriving at least one third pose of the real object by refining the view in the case where one image frame representing the real object having a third pose corresponding to the view of the 3D model is selected; and
tracking the third pose of the real object in at least one of preceding and succeeding image frames with respect to the selected one image frame,
wherein the appearance data of the real object and 2D model data of a third 2D model are stored in the memory with the appearance data and the 2D model data of the third 2D model being associated with each other, with respect to a plurality of the tracked poses.

7. The method according to claim 1, wherein the 2D model data includes contour feature information of the second 2D model.

8. A non-transitory computer readable medium storing instructions for generating training data for object detection, the instructions causing a processor to execute a process comprising:
obtaining, by the processor, image data of a real object captured by a camera;
obtaining, by the processor, a first 2D model obtained from a projection of a 3D model corresponding to the real object based at least on a first pose;
aligning, by the processor, a contour of the real object in the image data and a contour of the first 2D model so as to derive a second pose of the real object;
obtaining and associating, by the processor, (i) appearance data of the real object in the second pose, (ii) 2D model data of a second 2D model of the 3D model in the second pose, and (iii) the second pose; and
storing, by the processor, the appearance data of the real object, the 2D model data of the second 2D model, and the second pose into a memory.

9. The non-transitory computer readable medium according to claim 8, wherein the 2D model data includes contour feature information of the second 2D model.

* * * * *